March 23, 1937.  O. SHACKELFORD  2,074,595
CONVEYER
Filed Aug. 23, 1935  2 Sheets-Sheet 1
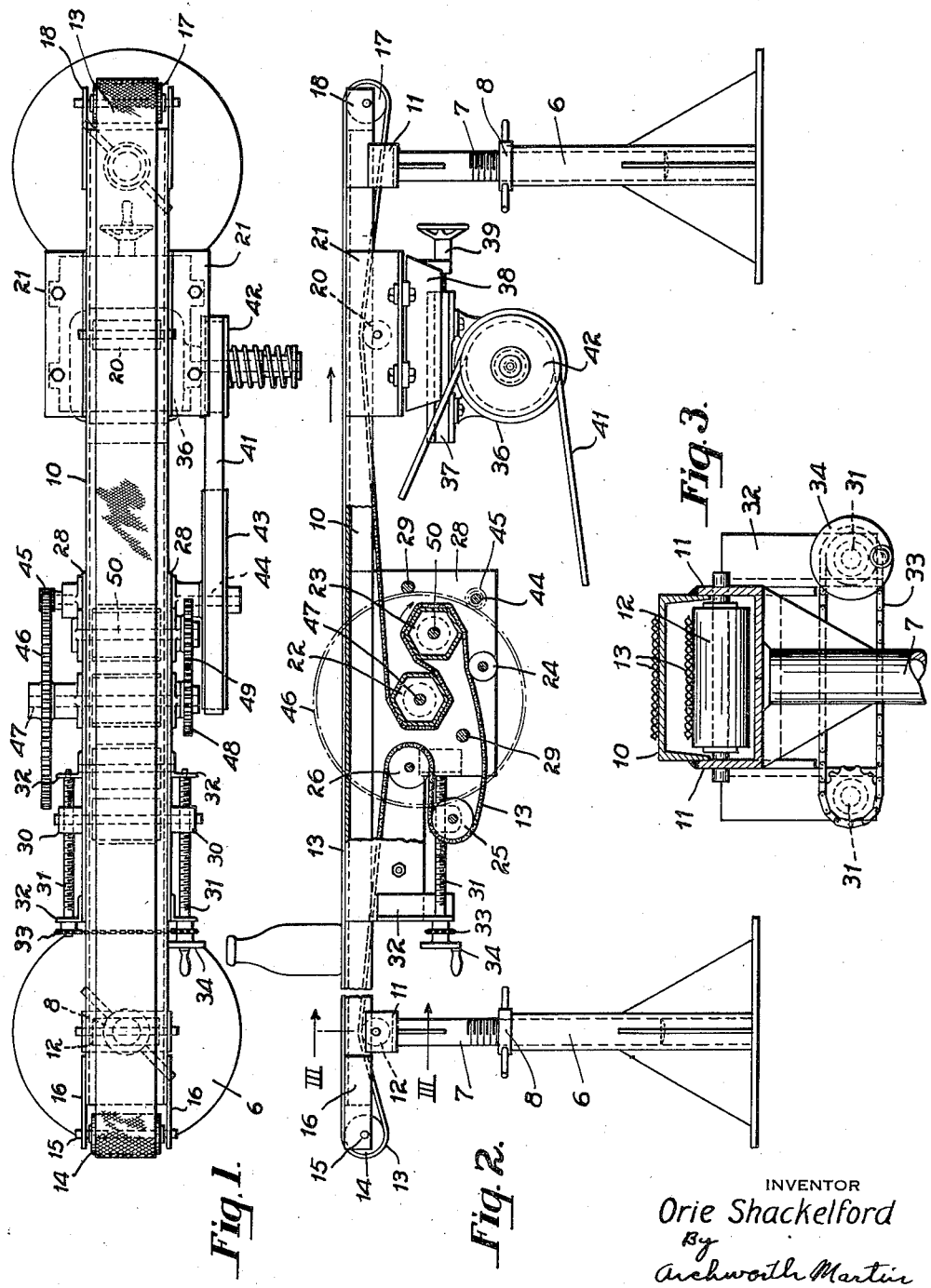
INVENTOR
Orie Shackelford
By
Archworth Martin
Attorney March 23, 1937.   O. SHACKELFORD   2,074,595
CONVEYER
Filed Aug. 23, 1935   2 Sheets-Sheet 2

INVENTOR
Orie Shackelford
By
Archworth Martin
attorney

Patented Mar. 23, 1937

2,074,595

UNITED STATES PATENT OFFICE 2,074,595

CONVEYER

Orie Shackelford, Fairmont, W. Va.

Application August 23, 1935, Serial No. 37,513

4 Claims. (Cl. 198—203)

My invention relates to conveyers of the belt type for transferring material such as glassware, etc., from one point to another, or through annealing lehrs.

In conveyers of this type, there is frequent slippage as between the belt-driving pulleys or drums and the belt, with the result that there is excessive wear on the belt-driving drums, and also irregular or jerky movements of the belt. In order to reduce such objectionable slippage to a minimum, the drums have heretofore been faced with rubber or other frictional facing material, and the belts have been kept excessively taut, with the result that there is considerable loss of power and excessive wear and strain both on the belt and on the pulleys and drums.

One object of my invention is to provide belt-driving drums or pulleys of such form that the belt can be somewhat slack, and danger of slippage nevertheless practically eliminated.

Another object of my invention is to provide belt-driving drums of such form that there is in effect geared relationship between the drum and the belt, particularly if belts of the wire mesh type be employed.

Figure 4:
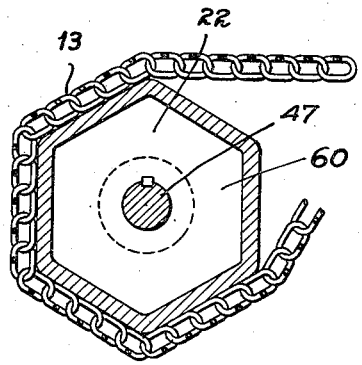
Figure 5:
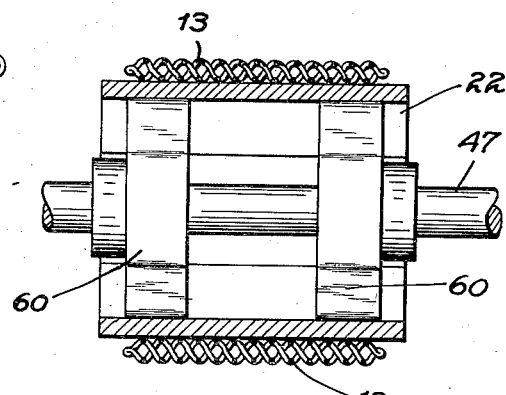
Figure 6:
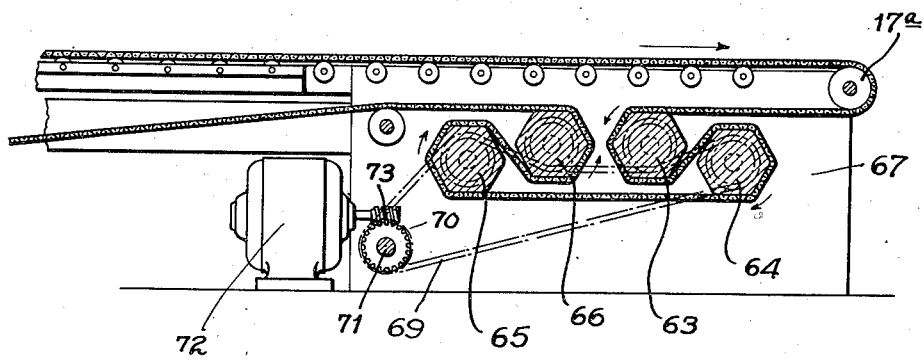

Some of the forms which my invention may take are shown in the accompanying drawings wherein Figure 1 is a plan view of a conveyer structure; Fig. 2 is a side view thereof, partially in section; Fig. 3 is a view taken on the line III—III of Fig. 2; Fig. 4 is a sectional view, on an enlarged scale, of one of the belt-driving drums of Fig. 2; Fig. 5 is a longitudinal sectional view of said drum, and Fig. 6 shows a modification of the structure of Fig. 2.

Referring first to Figs. 1 to 5, I show a conveyer or transfer apparatus that is mounted on pedestals 6 that are of cylindrical form, and into which jack screw members 7 extend. Adjusting nuts 8 are rotatably supported on the upper ends of the pedestals 6, and have threaded engagement with the screws 7, so that the nuts can be turned to raise and lower the ends of the conveyer. An inverted channel iron 10 serves as a run-way for the upper run of the belt. Angles 11 are welded to the channel 10, and to the upper ends of the screws 7, and serve as means for supporting the channel 10 upon the screws. The members 6, 7, 10 and 11 thereby constitute a conveyer frame which is adjustable at its ends to desired heights.

At the loading end of the conveyer a guide roller 12 is journalled in the angles 11, for vertically supporting and guiding the conveyer belt 13 at that point. At this end of the conveyer, a guide roller 14 is mounted on a shaft 15 which is journalled in plate extensions 16 that are welded to the flanges of the channel 10. At the discharge end of the conveyer, a guide roller 17 is similarly rotatably supported in extension plates 18 that are welded or otherwise secured to the channel 10. The belt, as shown, is of the jointed wire fabric type, such as those made after the manner of ordinary chain link mesh, with the strand of the mesh running crosswise thereof, and having jointed interlocking connection with one another, so that the belt will flex readily without actual bending of the individual strands.

The upper flight or run of the belt slides along the channel 10 in the direction indicated by the arrow in Fig. 2, and after passing around the pulley 17 at the discharge end of the conveyer passes over a supporting roller 20 which is journalled in angle plates 21 that are welded or bolted to the sides of the channel 10. Beyond this point, the belt passes around driving drums or pulleys 22 and 23; over an idler pulley 24 and around a slack adjuster roller 25; and guide pulley 26, and thence over the roller 12. The rollers or pulleys 22, 23, 24 and 26 are journalled in side plates 28 that are welded or bolted to the flanges of the channel 10. Tie bars or spacer bars 29 extend through the plates 28, for the purpose of holding them in rigid relative relationship.

The roller 25 is journalled in bearing blocks 30 that are supported upon and have screw-threaded engagement with adjusting screws 31. The ends of the screws 31 are rotatably supported in angle brackets 32 which are secured to the side plates 28. Each screw is provided with a sprocket wheel around which a sprocket chain 33 passes, so that when one of the screws 31 is adjusted by turning its hand wheel 34, the other screw will be correspondingly turned in order to effect tensioning adjustment of the roller 25.

The drums 22 and 23 are driven from a motor 36 that is mounted on a plate 37 that is slidably supported upon a bracket 38 which is supported from the angles 21. An adjusting screw 39 is journalled on the bracket 38 and has threaded engagement with the slide plate 37, so that the motor can be adjusted to vary the tension of a belt 41 which is driven by a pulley 42 which has slip-clutch connection with the motor shaft.

The belt 41 passes around a driving pulley 43 that is mounted on a shaft 44 that carries at its opposite end a pinion 45. The pinion 45 meshes with and drives a gear wheel 46 that is mounted on a shaft 47 that carries the drum 22. The shaft 47 carries a gear wheel 48 that meshes with and drives a gear wheel 49 that is mounted on a shaft 50 which carries the drum 23, so that the drums 22 and 23 are driven at the same rates of speed. The drums 22 and 23 are of polygonal form, and here shown as hexagonal, it being understood that they can have a greater or lesser number of sides than shown. The drums can suitably be made of flat plates welded together at their edges, and having web plates 60 welded therein and serving as hubs.

As shown more clearly in Figs. 4 and 5, there is in effect a hinge joint between each helical cross strand of the belt 13, and each face of the hexagonal drums is preferably of such width it is a multiple of the center-to-center spacing of the hinge joints, so that there is a minimum danger of deformation of the belt when it is flexed on the drums, and also more positive driving action.

The drums are in approximately side-by-side relation, and of course, turn in opposite directions. The belt contacts with four flat surfaces of each drum, and four corners of each drum are constantly in driving engagement with the belt, as shown more clearly in Fig. 4. It will be understood that a somewhat similar positive driving action would be secured with belts of other form than the mesh type, since in that case the corners of the drum faces will exert a pulling force instead of depending upon a purely frictional pull as in the case of circularly-shaped drums.

Referring now to Fig. 6, I show one end of a conveyer which may in its other particulars be of substantially the form shown in Figs. 1 to 3. This belt is provided with additional driving drums so that it is more suitable for use in conveying heavy loads, through glassware annealing lehrs for example. The lehr belts are usually of considerable width and great length, and are required in many cases to move a load of perhaps two tons of glassware through a lehr.

Fig. 6 shows the discharge end of the conveyer wherein the belt passes around a pulley 17a, and around drums 63, 64, 65 and 66 successively, the drums being arranged in pairs somewhat after the manner of the drums 22 and 23, so that each drum will always have four of its faces in contact with the lehr belt. In this case, the drums are shown as of solid form instead of hollow, and are suitably journalled in supporting frames 67. Sprocket wheels are mounted on shaft-like extensions at an end of each drum, and a sprocket chain 69 passes around said sprocket wheels, as shown, in order to effect rotation of the drums in directions to drive the belt in the directions indicated by the arrows. The chain 69 is driven from a sprocket wheel 70 that is mounted on a shaft 71, the shaft 71 being driven by a motor 72 through a worm drive 73.

The driving drums 63 to 66 may suitably be four inches in diameter. By making the drums relatively small, the belt joints are bent to sharper angles, and more positive driving force therefore exerted.

As shown in Figs. 2 and 6, the adjacent polygonally faced pulleys are so arranged that when an angular surface on one pulley is passing out of engagement with the belt, an angular surface or corner on the adjacent pulley is entering into engagement with the belt. This relative arrangement of the pulleys is of advantage because the tendency toward loosening of the belt when one angular surface is passing away therefrom is compensated for by the tautening effect of the angle on the adjacent pulley. Consequently, there is smoother movement of the belt, which is particularly important where glassware is being carried. Also the pulling strains on the belt are not so great. The relative circumferential positions of the pulleys are maintained either by the geared or sprocket chain drive connections, or if one of the pulleys is idle, the belt joints will maintain the pulleys in such proper positions.

I claim as my invention:—

1. The combination with an endless conveyer belt and guide members therefor, of a pair of polygonally faced driving pulleys mounted in approximately side-by-side relation, but with their axes relatively offset vertically a distance not substantially greater than the radius of one of the pulleys, the belt extending from an upper plane downwardly around the higher pulley and thence upwardly between the pulleys and downwardly around the lower pulley, each angle on the face of one pulley passing out of engagement with the belt as an angle on the face of the other pulley engages the belt.

2. The combination with an endless conveyer belt and guide members therefor, of a pair of polygonally faced pulleys, one of which is a driving pulley, mounted in approximately side-by-side relation, but with their axes relatively offset vertically a distance not substantially greater than the radius of one of the pulleys, the belt extending from an upper plane downwardly around the higher pulley and thence upwardly between the pulleys and downwardly around the lower pulley, each angle on the face of one pulley passing out of engagement with the belt as an angle on the face of the other pulley engages the belt.

3. The combination with an endless conveyer belt and guide members therefor, of a pair of polygonally faced driving pulleys in approximately side-by-side relation, but with their axes relatively offset vertically a distance not substantially greater than the radius of one of the pulleys, the belt passing from an upper plane downwardly around the higher pulley and thence upwardly between the pulleys and downwardly around the lower pulley, each angle on the face of one pulley passing out of engagement with the belt as an angle on the face of the other pulley engages the belt, the pulleys being geared together and of approximately equal dimensions.

4. The combination with an endless conveyer belt and guide members therefor, of a pair of polygonally faced pulleys, one of which is a driving pulley, mounted in approximately side-by-side relation, but with their axes relatively offset vertically a distance not substantially greater than the radius of one of the pulleys, the belt extending from an upper plane downwardly around the higher pulley and thence upwardly between the pulleys and downwardly around the lower pulley, each angle on the face of one pulley passing out of engagement with the belt as an angle on the face of the other pulley engages the belt, the belt being composed of elements which are hingedly connected on axes extending transversely of the belt, and the widths of the pulley faces, in tangential directions, being multiples of the spacing between said belt joints.

ORIE SHACKELFORD.